United States Patent
Tsubota et al.

(10) Patent No.: US 8,029,196 B2
(45) Date of Patent: Oct. 4, 2011

(54) ELECTRONIC DEVICE

(75) Inventors: Noriyuki Tsubota, Osaka (JP);
Yasuhiro Kondo, Maebashi (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 12/509,839

(22) Filed: Jul. 27, 2009

(65) Prior Publication Data

US 2010/0021153 A1 Jan. 28, 2010

(30) Foreign Application Priority Data

Jul. 28, 2008 (JP) ................................. 2008-193388

(51) Int. Cl.
*G03B 17/00* (2006.01)

(52) U.S. Cl. ....................................... 396/419; 352/243
(58) Field of Classification Search .................. 396/419, 396/428; 352/243; 243/163.1
See application file for complete search history.

(56) References Cited

U.S. PATENT DOCUMENTS

| 4,081,808 A * | 3/1978 | Pizzuti .......................... 396/346 |
| 4,341,452 A * | 7/1982 | Korling .......................... 396/428 |
| 2007/0090235 A1* | 4/2007 | Ziemkowski et al. ..... 248/163.1 |

FOREIGN PATENT DOCUMENTS

| JP | 60-23146 Y2 | 7/1985 |
| JP | 10-161210 A | 6/1998 |

* cited by examiner

*Primary Examiner* — Clayton E LaBalle
*Assistant Examiner* — Autumn Parker
(74) *Attorney, Agent, or Firm* — Westerman, Hattori, Daniels & Adrian, LLP

(57) ABSTRACT

The electronic device according to the present invention has a device body capable of attaching a second device thereto by a screw member, and comprises a chassis provided to the device body, a mounting seat made of resin for attaching the second device, and a metal plate, the mounting seat is provided to the chassis and provided with a female screw formed therein in which the screw member is to be threaded as well as a closing part defining a bottom surface of the female screw and a back surface of the mounting seat, and the metal plate is fixed to the mounting seat to support the closing part by supporting a back surface thereof.

3 Claims, 8 Drawing Sheets

ELECTRONIC DEVICE

The application Number 2008-193388 upon which this patent application is based, is hereby incorporated by reference.

BACKGROUND OF THE INVENTION

1. Field of the Invention

The present invention relates to an electronic device capable of attaching a second device such as a tripod.

2. Description of Related Art

Digital cameras conventionally have structures capable of attaching a tripod. In particular, a digital camera has a tripod mounting seat having a female screw formed therein, and a male screw (a screw member) projecting from the tripod is threaded into the female screw of the tripod mounting seat to attach the tripod to the digital camera, thereby holding the digital camera in a predetermined position.

In conventional digital cameras, tripod mounting seats made of resin have been used. Also, in order to prevent water, dust or the like from entering inside the digital camera through the female screw, the tripod mounting seat is concave and the female screw is formed on an inner peripheral surface of the tripod mounting seat. Therefore, in the case where a thickness between a bottom surface of the female screw and a back surface of the tripod mounting seat (hereinafter referred to as "thickness") is small, it is possible to have a problem when the male screw is threaded into the female screw of the tripod mounting seat. The problem is such that when a further screwing power is applied to the male screw of the tripod after the male screw reaches the bottom surface of the female screw, the male screw penetrates the bottom surface of the female screw. If the bottom surface of the female screw is penetrated, water, dust or the like may enter inside the digital camera through the female screw, resulting in a breakdown of the digital camera.

In view of this, in a conventional digital camera, as shown in FIG. 10, in order to prevent the bottom surface of the female screw from being penetrated, a thickness L9 between a bottom surface 92 of the female screw 91 and a back surface 93 of a tripod mounting seat 9 is large. In particular, the thickness L9 is at least 2 mm.

However, a thick tripod mounting seat prevents downsizing of a digital camera. A die casting tripod mounting seat may be adopted for realizing both downsizing of the digital camera and enhancing strength of the bottom surface. However, the adopting of a die casting tripod mounting seat results in an increase in the manufacturing cost of the camera. Such a problem may arise not only in a digital camera, but also any electronic devices capable of attaching a second device such as a tripod by a screw member.

SUMMARY OF THE INVENTION

In view of above described problem, an object of the present invention is, in an electronic device capable of attaching a second device by a screw member, to prevent entry of water, dust or the like inside an electronic device due to a bottom surface of a female screw being penetrated.

An electronic device of the present invention has a device body capable of attaching a second device thereto by a screw member, and comprises a chassis provided to the device body, a mounting seat made of resin for attaching the second device, and a metal plate, the mounting seat is provided to the chassis and provided with a female screw formed therein in which the screw member is to be threaded as well as a closing part defining a bottom surface of the female screw and a back surface of the mounting seat, and the metal plate is fixed to the mounting seat to support the closing part by supporting a back surface thereof.

According to the electronic device of the present invention, since the closing part defining the bottom surface of the female screw and the back surface of the mounting seat closes on the back surface of the mounting seat the female screw formed in the mounting seat, it is possible to prevent water, dust or the like from entering inside the electronic device. Also, even when a further screwing power is applied to the screw member after the screw member reaches the bottom surface of the female screw, the screwing power is received by the metal plate. Therefore, the screw member does not break through the closing part, thereby preventing entry of water, dust or the like inside the electronic device due to the bottom surface of the female screw being penetrated.

In a particular configuration of the electronic device described above, the chassis is made of resin, the mounting seat is formed integrally with the chassis, the mounting seat has a bottomed cylindrical form opening toward outside the chassis, and the female screw is formed on an inner peripheral surface of the mounting seat.

According to the particular configuration described above, the electronic device having a structure of forming the mounting seat integrally with the chassis is manufactured more easily than that having a structure of attaching the separately made mounting seat to the chassis. Also, forming the mounting seat in a bottomed cylindrical form realizes a decrease in size of the mounting seat, and therefore, the mounting seat does not prevent downsizing of the electronic device.

As described, according to the present invention, it is possible to prevent entry of water, dust or the like inside the electronic device due to the bottom surface of the female screw being penetrated.

DETAILED DESCRIPTION OF THE PREFERRED EMBODIMENT

In a preferred embodiment discussed in detail below with reference to drawings, the present invention is implemented in a digital camera.

Figure 1:
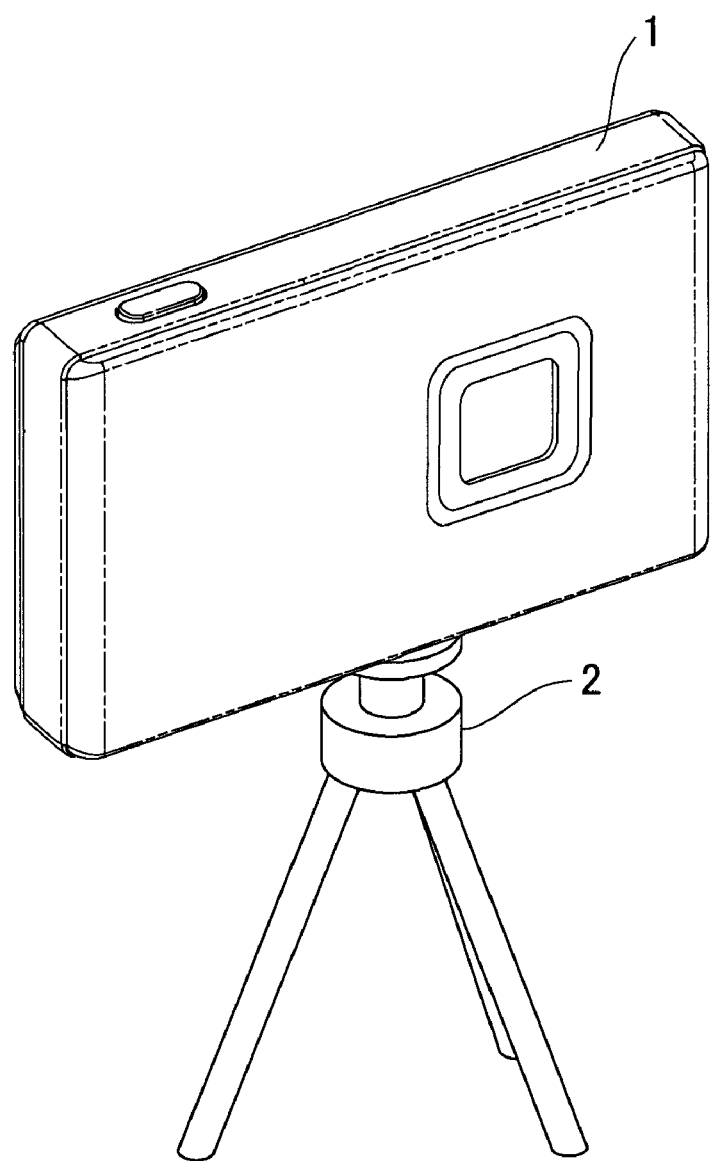
FIG. 1 is a perspective view of a digital camera with a tripod being attached thereto.
Figure 2:
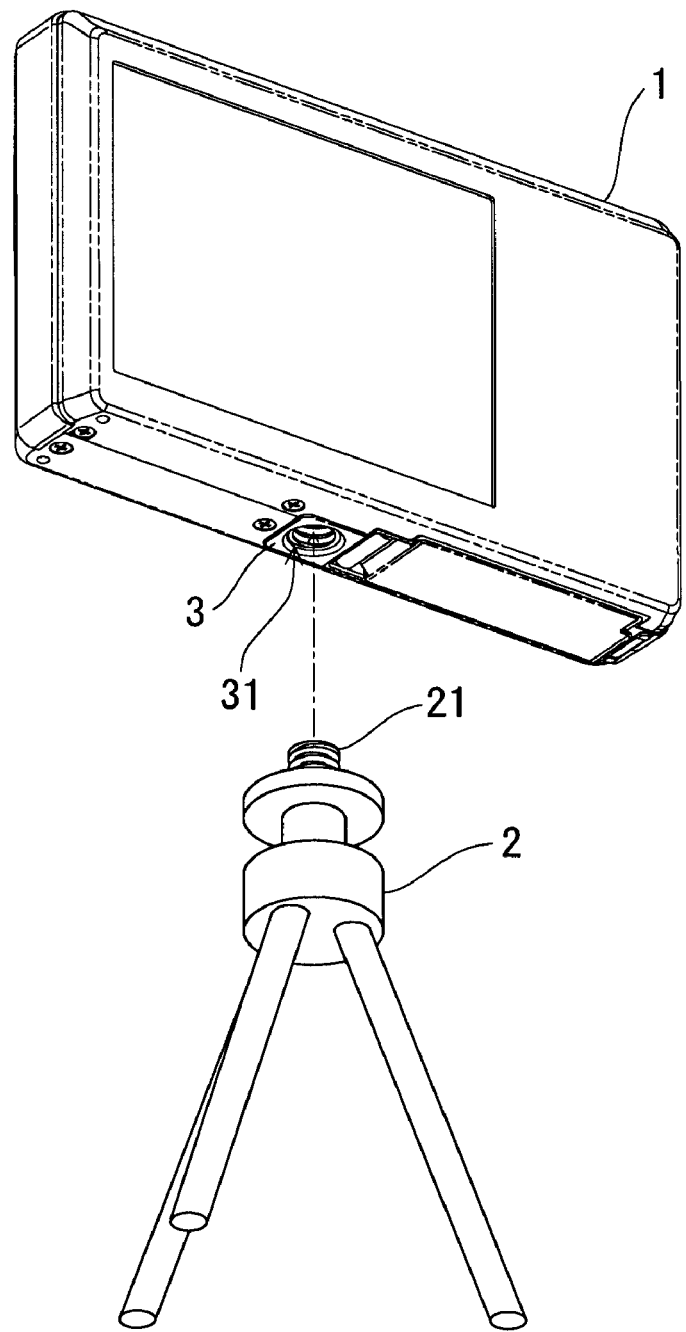
FIG. 2 is a perspective view of the digital camera with the tripod removed therefrom.
Figure 3:
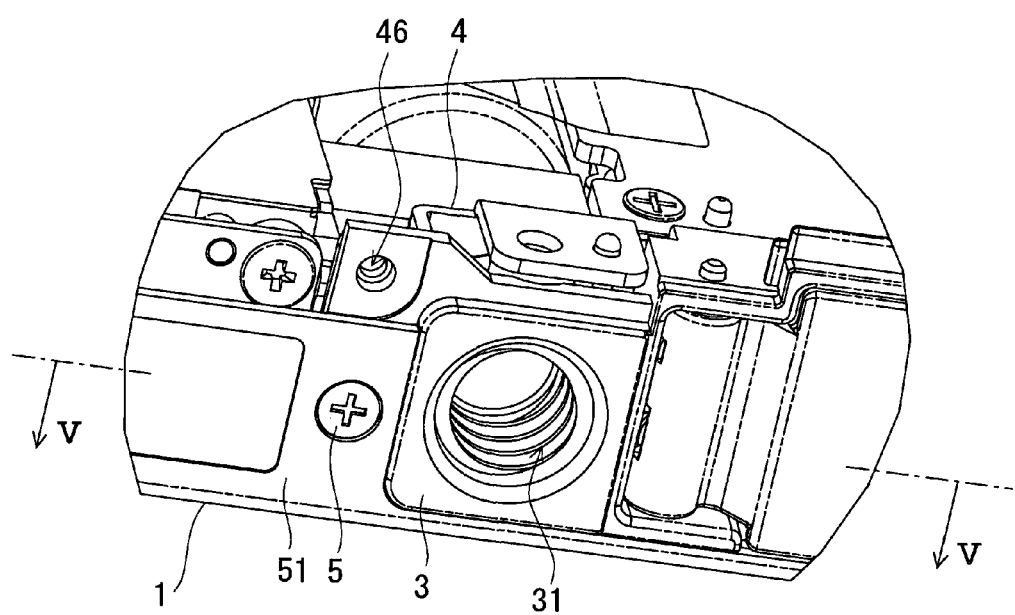
FIG. 3 is an enlarged perspective view of the digital camera showing a main part thereof.

A digital camera according to an embodiment of the present invention, as shown in FIG. 1, has a camera body 1 capable of attaching a tripod 2 thereto. The camera body 1 is provided with a mounting seat 3 made of resin for attaching the tripod 2 as shown in FIGS. 2 and 3. A female screw 31 is formed in the mounting seat 3, and a male screw 21 projecting from the tripod 2 is threaded into the female screw 31 to attach the tripod 2 to the camera body 1.

Figure 4:
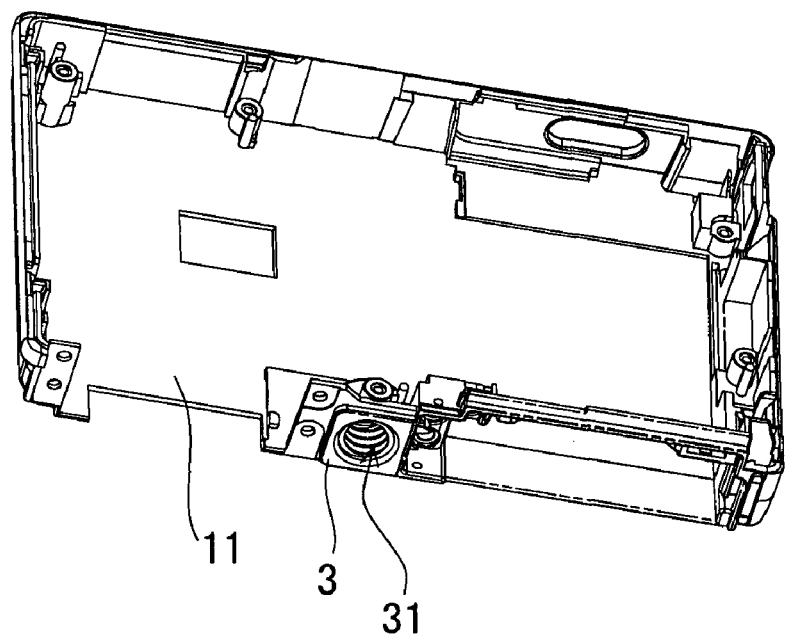
FIG. 4 is a perspective view of a chassis of the digital camera.

The mounting seat 3 is provided to a chassis 11 (FIG. 4) made of resin provided in the camera body 1. The mounting seat 3 may either be formed integrally with the chassis 11 or attached to the chassis 11 as a separately made element. Here in the digital camera according to this embodiment, the mounting seat 3 is formed integrally with the chassis 11 as shown in FIG. 4. The digital camera having a structure of forming the mounting seat 3 integrally with the chassis 11 is manufactured more easily than that having a structure of attaching the separately made mounting seat 3 to the chassis 11.

Figure 5:
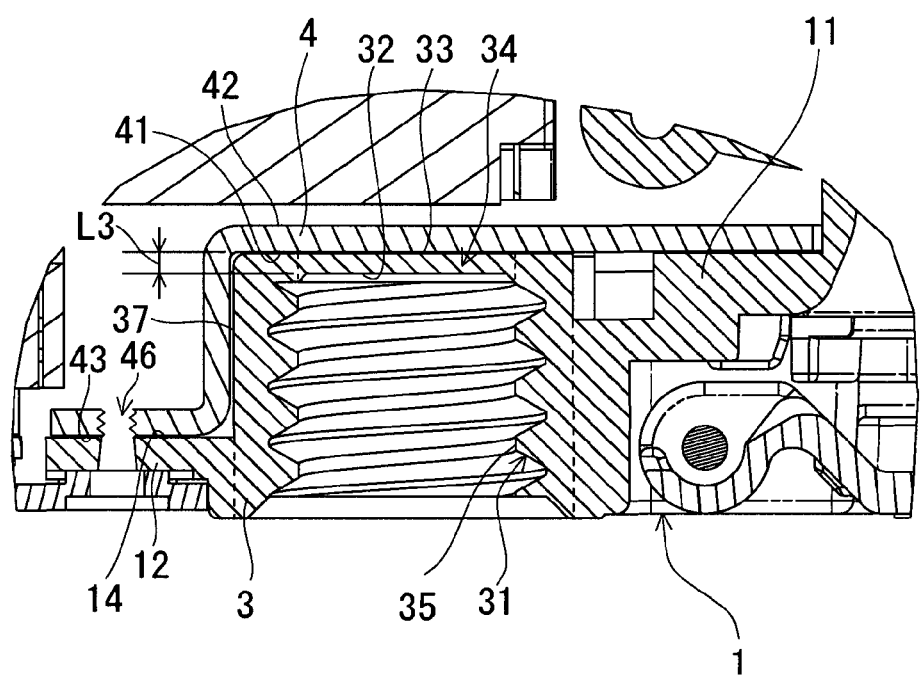
FIG. 5 is a cross-sectional view taken along the line V-V shown in FIG. 3.
Figure 6:
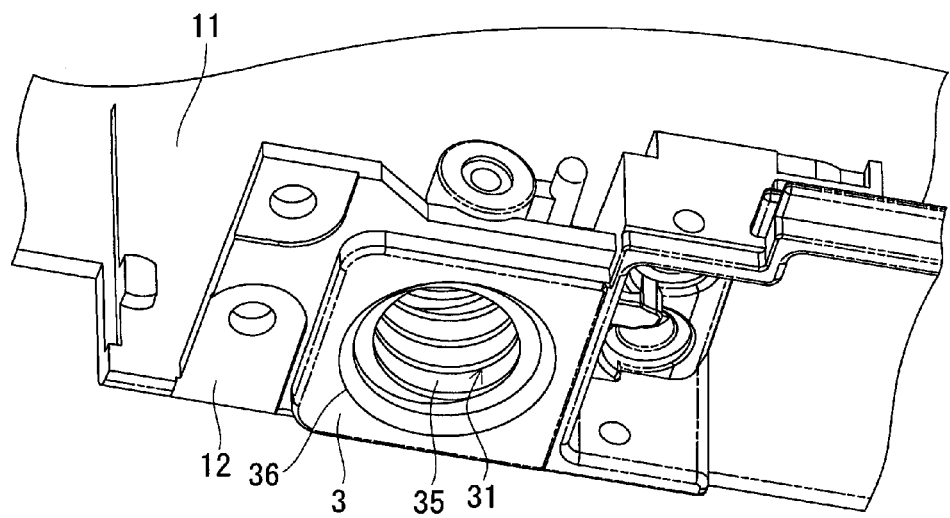
FIG. 6 is an enlarged perspective view of a mounting seat viewed from an opening part side.
Figure 7:
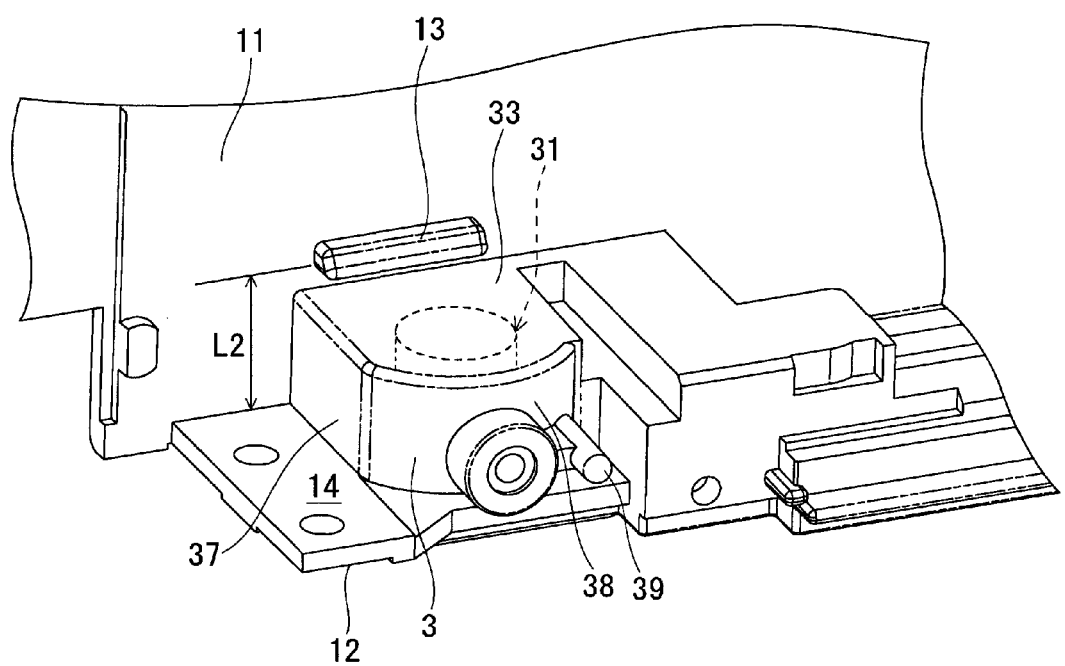
FIG. 7 is an enlarged perspective view of the mounting seat viewed from a back surface side.

As shown in FIG. 5, the mounting seat 3 is provided with a closing part 34 defining a bottom surface 32 of the female screw 31 and a back surface 33 of the mounting seat 3. In particular, the mounting seat 3 has a bottomed cylindrical form as shown in FIGS. 5 to 7, opening toward outside the chassis 11 as shown in FIG. 4. The female screw 31 is formed on the inner peripheral surface 35 of the mounting seat 3. Here, forming the mounting seat 3 in a bottomed cylindrical form realizes a decrease in size of the mounting seat 3, and therefore, the mounting seat 3 does not prevent downsizing of the digital camera.

Figure 8:
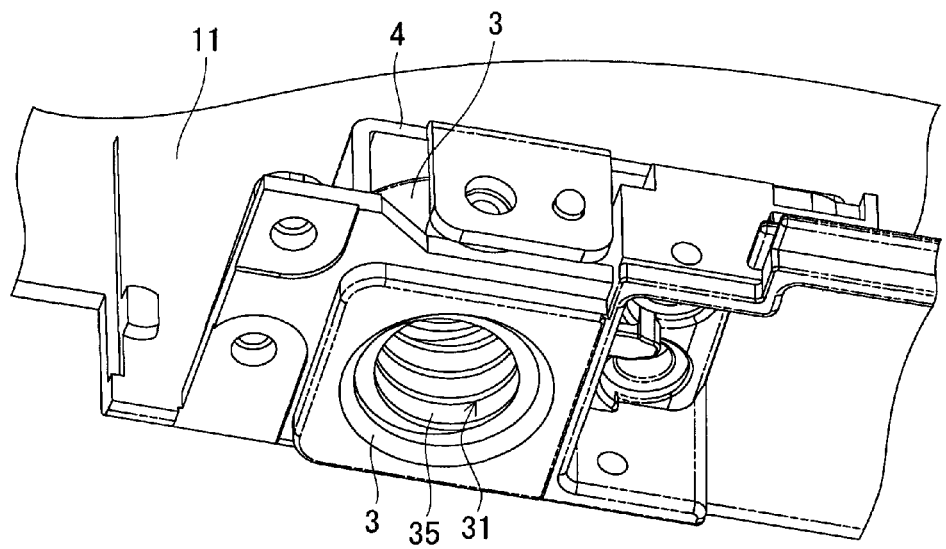
FIG. 8 is an enlarged perspective view of the mounting seat with a metal plate fixed thereto viewed from the opening part side.
Figure 9:
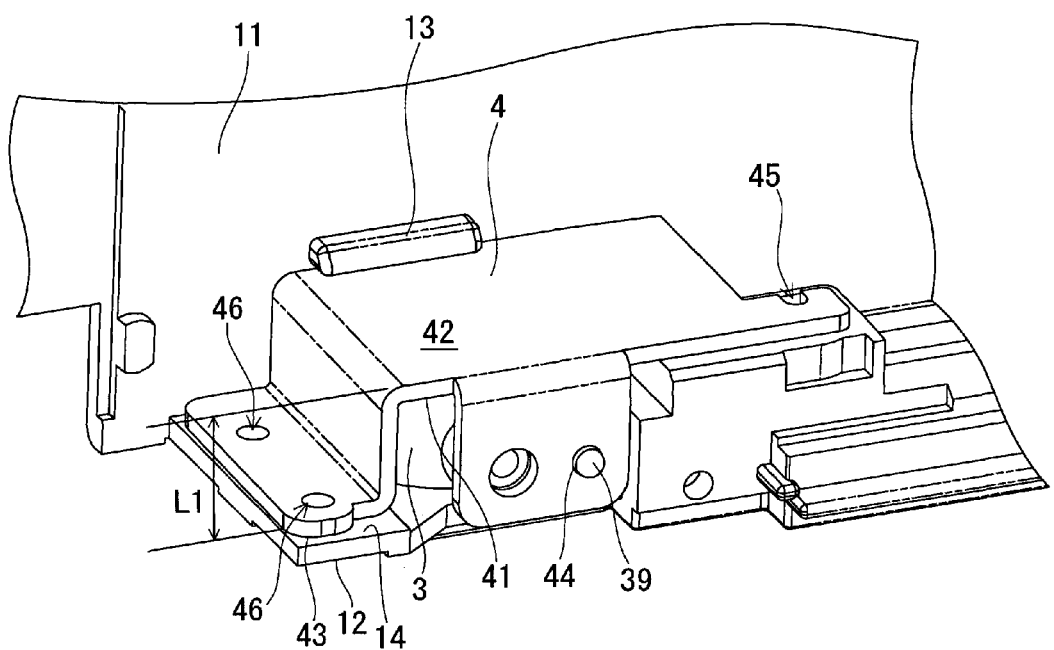
FIG. 9 is an enlarged perspective view of the mounting seat with the metal plate fixed thereto viewed from the back surface side.

As shown in FIGS. 5, 8 and 9, a metal plate 4 for supporting the closing part 34 by supporting the back surface 33 is fixed to the mounting seat 3. In particular, the metal plate 4 is fixed to the back surface 33 in a manner to be described below.

As shown in FIG. 6, a part 12 of the chassis 11 (a metal plate fixing part) is disposed adjacent to an opening part 36 of the mounting seat 3. Also, as shown in FIG. 7, a projecting part 13 is formed on the chassis 11 at a position separated from the back surface 33 of the mounting seat 3 in a direction opposite to the female screw 31. As shown in FIG. 5, the metal plate 4 extends in a crank shape along the back surface 33 of the mounting seat 3, an outer peripheral surface 37, and a back surface 14 of the metal plate fixing part 12 to abut against the back surface 33 and the back surface 14. A back surface 42 of the metal plate 4 disposed oppositely to an abutment surface 41 which abuts against the back surface 33 abuts against the projecting part 13.

As shown in FIGS. 7 and 9, the metal plate 4 is bent in a crank shape so that a distance L1 (FIG. 9) between an abutment surface 43 of the metal plate 4 which abuts against the back surface 14 of the metal plate fixing part 12 and the back surface 42 of the metal plate 4 is greater than a distance L2 (FIG. 7) between the back surface 14 of the metal plate fixing part 12 and the projecting part 13. Thus, the metal plate 4 attached to the back surface 33 of the mounting seat 3 is held between the metal plate fixing part 12 and the projecting part 13 with a pressing force applied thereto, thereby fixing the metal plate 4 on the back surface 33 of the mounting seat 3.

A projecting part 39 is formed on an outer peripheral surface 38 of the mounting seat 3 as shown in FIG. 7. Also, a fitting hole 44 is defined in the metal plate 4 as shown in FIG. 9. When the metal plate 4 is attached to the back surface 33 of the mounting seat 3, the projecting part 39 is fitted in the fitting hole 44, thereby fixing the metal plate 4 more firmly to the back surface 33 of the mounting seat 3.

The camera body 1 is provided with a lock lever (not shown) for preventing a rechargeable battery stored therein from falling off, and the metal plate 4 is provided with a pivoting hole 45 for pivotally supporting the lock lever as shown in FIG. 9. Also, a female screw 46 is formed in the metal plate 4 as shown in FIG. 9 to fix a cabinet 51 to the chassis 11 by a screw member 5 as shown in FIG. 3. In other words, the metal plate 4 has a function of pivotally supporting the lock lever, a function of fixing the cabinet 51 to the chassis 11 and a function of supporting the mounting seat 3 by supporting the back surface 33.

According to the digital camera described above, the closing part 34 defining the bottom surface 32 of the female screw 31 and the back surface 33 of the mounting seat 3 closes on the back surface 33 of the mounting seat 3 the female screw 31 formed in the mounting seat 3, thereby preventing entry of water, dust or the like inside the camera body 1 through the female screw 31. Also, since the mounting seat 3 is made of resin, electric components disposed in the camera body 1 are prevented from breakage due to static electricity.

Further, even when a further screwing power is applied to the male screw 21 of the tripod 2 after the male screw 21 reaches the bottom surface 32 of the female screw 31, the screwing power is received by the metal plate 4. Thus, the male screw 21 does not break through the closing part 34, thereby preventing the female screw 31 from being penetrated as well as preventing entry of water, dust or the like inside the camera body 1.

Figure 10:
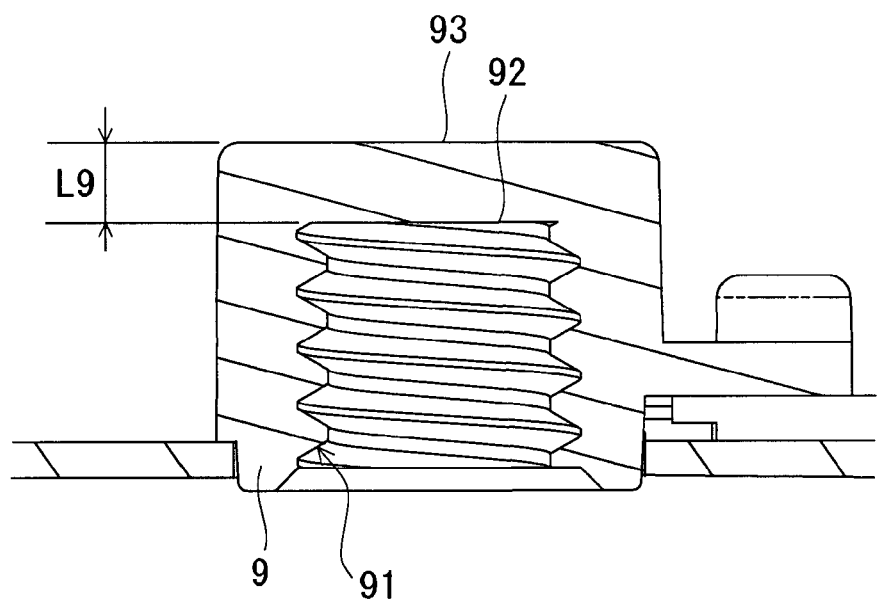
FIG. 10 is a cross-sectional view of a conventional tripod.

Also, according to the digital camera described above, since the metal plate 4 prevents the female screw 31 from being penetrated, a thickness L3 of the closing part 34 of the mounting seat 3 (FIG. 5) may be smaller than the thickness L9 of the conventional mounting seat 9 shown in FIG. 10. In particular, the thickness L3 may be around 0.4 mm. Since a thickness of the metal plate 4 is around 0.6 mm, a thickness of the closing part 34 and the metal plate 4 is around 1 mm, which is smaller than the thickness L9 of the conventional mounting seat 9.

The structure of each part of the present invention is not limited to the above embodiment, and various modifications may be made within the technical scope set forth in the claims. For example, the art described above may be adopted not only in digital cameras and tripods to be attached thereto, but also in various electronic devices and second devices to be attached thereto such as a monitoring camera and a hard disk drive to be attached thereto.

What is claimed is:

1. An electronic device having a device body capable of attaching a second device thereto by a screw member, the electronic device comprising:
   a chassis provided in the device body;
   a mounting seat made of resin, disposed on the chassis, and having a female screw for attaching the second device and a closing part defining both a bottom surface of the female screw and a back surface of the mounting seat; and
   a metal plate fixed to the mounting seat to support the closing part by supporting a back surface thereof.

2. The electronic device according to claim 1, wherein the chassis is made of resin, the mounting seat is formed integrally with the chassis, the mounting seat has a bottomed cylindrical form opening toward outside the chassis, and the female screw is formed on an inner peripheral surface of the mounting seat.

3. An electronic device attachable to a second device, said electronic device comprising:
   a device body having a chassis;
   a mounting seat made of resin, disposed on the chassis, and having a female screw for attachment to the second device and a closing part defining both a bottom surface of the female screw and a back surface of the mounting seat; and
   a metal plate fixed to the mounting seat, extending over the closing part, and supporting the back surface of the mounting seat.

* * * * *